(12) United States Patent
Sula (10) Patent No.: US 11,441,457 B2
(45) Date of Patent: Sep. 13, 2022

(54) TWO-STROKE ENGINE EXHAUST RESONATOR WITH EXHAUST GAS CATALYTIC CONVERTER

(71) Applicant: Martin Sula, Zidenice (CZ)

(72) Inventor: Martin Sula, Zidenice (CZ)

( * ) Notice: Subject to any disclaimer, the term of this patent is extended or adjusted under 35 U.S.C. 154(b) by 180 days.

(21) Appl. No.: 16/970,576

(22) PCT Filed: Feb. 19, 2019

(86) PCT No.: PCT/CZ2019/050006
§ 371 (c)(1),
(2) Date: Aug. 17, 2020

(87) PCT Pub. No.: WO2019/158138
PCT Pub. Date: Aug. 22, 2019

(65) Prior Publication Data
US 2021/0115823 A1  Apr. 22, 2021

(30) Foreign Application Priority Data

Feb. 19, 2018 (CZ) .................................. CZ2018-80

(51) Int. Cl.
*F01N 1/02* (2006.01)
*F01N 3/04* (2006.01)
(Continued)

(52) U.S. Cl.
CPC ............. *F01N 1/026* (2013.01); *F01N 1/084* (2013.01); *F01N 1/089* (2013.01); *F01N 3/04* (2013.01); *F01N 3/10* (2013.01); *F01N 3/2885* (2013.01); *F01N 13/141* (2013.01); *G10K 11/172* (2013.01); *F01N 2230/04* (2013.01);
(Continued)

(58) Field of Classification Search
CPC .......... F01N 1/026; F01N 1/084; F01N 1/089; F01N 3/04; F01N 3/10; F01N 3/2885; F01N 13/141; F01N 2230/04; F01N 2240/02; F01N 2260/024; F01N 2470/24; F01N 2470/30; F01N 2490/18; G10K 11/172
See application file for complete search history.

(56) References Cited

U.S. PATENT DOCUMENTS

| | | | | |
|---|---|---|---|---|
| 5,738,184 A | * | 4/1998 | Masuda | ................... F01N 1/089 60/299 |
| 2017/0167333 A1 | * | 6/2017 | Masui | ................... F01N 3/2885 |

FOREIGN PATENT DOCUMENTS

| | | | | |
|---|---|---|---|---|
| CN | 101205822 A | * | 6/2008 | ............. F01N 1/003 |
| CN | 107965383 A | * | 4/2018 | ............. F01N 13/14 |

* cited by examiner

*Primary Examiner* — Audrey B. Walter
(74) *Attorney, Agent, or Firm* — Suzannah K. Sundby, Esq.; Canady + Lortz LLP (57) ABSTRACT

A two-stroke engine exhaust resonator with an exhaust gas catalytic converter comprising an inlet opening, wherein the inlet opening is followed by the first end of a stabilizing tube with a catalytic converter mounted thereon, characterized in that the other end of the stabilizing tube is directed towards the primary reflective surface, the primary reflective surface is followed by the first end of a resonator casing, which is surrounding the stabilizing tube, wherein the resonator casing exceeds at least over a part of the catalytic converter on the stabilizing tube, wherein a resonator outlet opening is arranged in the resonator casing between its first and second end or in the primary reflective surface, and at least a part of the resonator casing surrounding the stabilizing tube is surrounded by a cooler.

17 Claims, 5 Drawing Sheets

Fig. 5

(51) Int. Cl.
    *F01N 3/28*          (2006.01)
    *F01N 3/10*          (2006.01)
    *F01N 13/14*        (2010.01)
    *F01N 1/08*          (2006.01)
    *G10K 11/172*      (2006.01)

(52) U.S. Cl.
    CPC .... *F01N 2240/02* (2013.01); *F01N 2260/024* (2013.01); *F01N 2470/24* (2013.01); *F01N 2470/30* (2013.01); *F01N 2490/18* (2013.01)

TWO-STROKE ENGINE EXHAUST RESONATOR WITH EXHAUST GAS CATALYTIC CONVERTER

FIELD OF THE INVENTION

The invention refers to thermal control of catalytic reaction in the two-stroke engine exhaust resonator with exhaust gas catalytic converter.

BACKGROUND OF THE INVENTION

Figure 1:
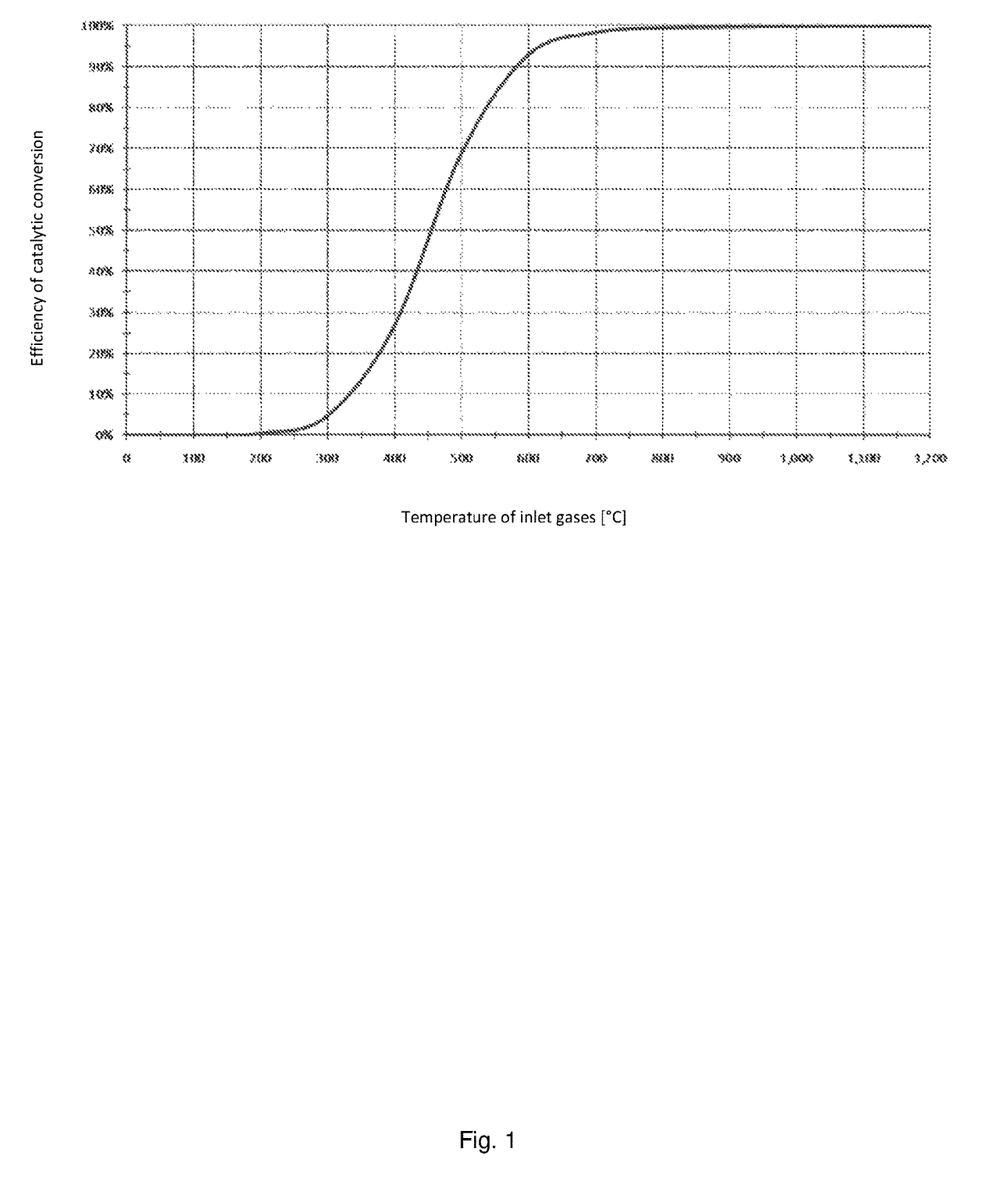
FIG. 1 shows a graph of catalytic conversion dependency on the temperature of inlet gases.

Two-stroke engines have to fulfill strict emission regulations while in operation. One way to reduce unwanted components in exhaust gases is the usage of some kind of an exhaust gas catalytic converter. Exhaust gas catalytic converters operate on the basis of oxidation and reduction reactions, which cause a reduction in toxic gaseous components, in particular unburned hydrocarbons (HC), carbon monoxide (CO) and nitrogen oxide (NOX). Depending on the temperature of inlet gases, see FIG. 1, an oxidation reaction of CO and HC into $CO_2$ and $H_2O$ is achieved wherein platinum coating is used as the catalytic part, and a reduction reaction of NOX into $N_2$ and $O_2$ is achieved wherein rhodium coating is used as the catalytic part. The main issue for achieving quality catalytic reaction is to keep operation temperatures in the effective range in all operating modes of the engine. In transient operation of the engine, insufficient heating of the catalytic converter by exhaust gasses during low loads occurs due to the lower temperature thereof and the volumetric flow rate. On the contrary, with the high load, overheating of the catalytic converter may occur due to the high temperature of exhaust gases.

Figure 2:
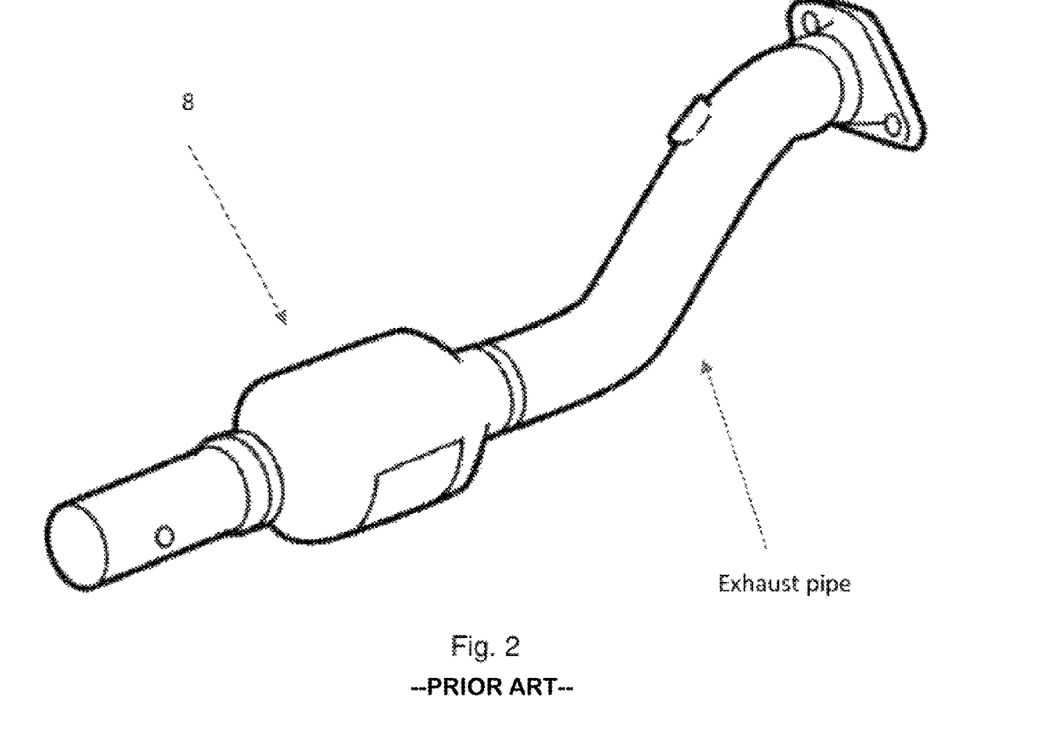
FIG. 2 shows a conventional embodiment of the placement of the exhaust gas catalytic converter in the exhaust pipe system.

Technological embodiment of catalytic converter is usually realized by attaching the catalytic converter to an exhaust pipe system in sufficient proximity to an exhaust port of the engine in order to cause fast heating thereof, see FIG. 2. With this conventional usage of the exhaust gas catalytic converter, heat losses from the catalytic converter occur and thus its operation temperature is reduced. During the low load operation, a decrease in efficiency occurs due to the low temperature of the active coating.

Figure 3:
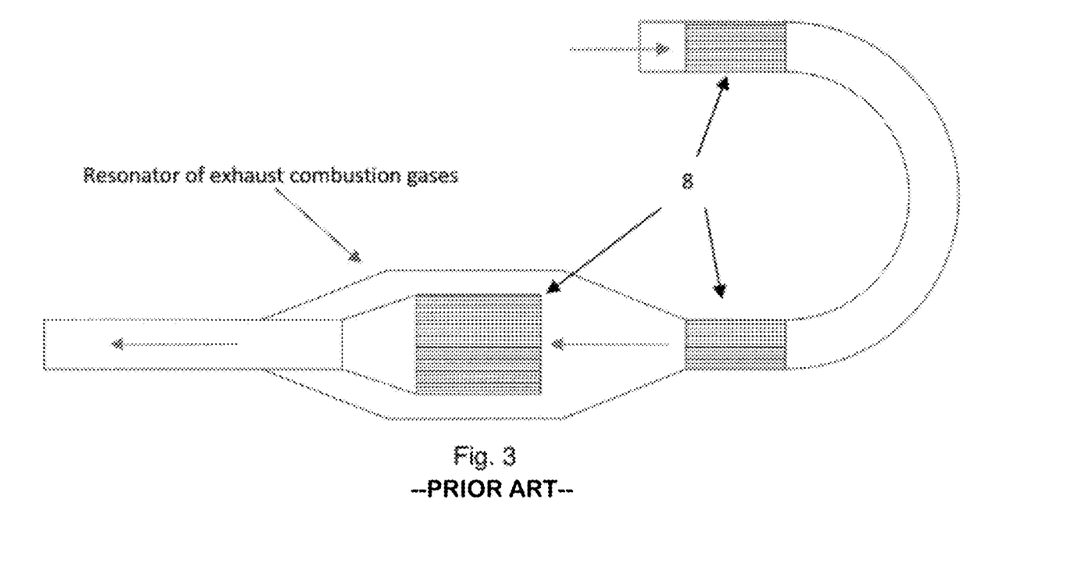
FIG. 3 shows schematic view of the two-stroke engine exhaust resonator with three catalytic converters known from the state of art.

Another option is to use more serially-connected catalytic converters, see FIG. 3. Higher number of catalytic units compensate for lower quality of catalytic conversion due to lower operating temperature of the catalytic converter. However, this system is too complicated, expensive for production, and it reaches low engine power due to high number of catalytic converters.

The main object of the invention is to ensure efficient thermal regulation of the exhaust gas catalytic convertor unit.

SUMMARY OF THE INVENTION

This objective is achieved by a two-stroke engine exhaust resonator with exhaust gas catalytic converter comprising an inlet opening, wherein the inlet opening is followed by the first end of a stabilizing tube with a catalytic converter mounted thereon, characterized in that the other end of the stabilizing tube is directed towards the primary reflective surface, the primary reflective surface is followed by the first end of a resonator casing which is surrounding the stabilizing tube, wherein the resonator casing exceeds at least over a part of the catalytic converter on the stabilizing tube, wherein a resonator outlet opening is arranged in the resonator casing between its first and second end or in the primary reflective surface, and at least a part of the resonator casing surrounding the stabilizing tube is surrounded by a cooler.

The solution according to this invention with the resonator casing guarantees the heat insulation of the two-stroke engine catalytic converter by heated exhaust gases closed in a resonant chamber and thus noticeably increases the operating temperature of the catalytic converter contrary to a conventional embodiment. Thus, it is possible to use only one catalytic converter in modes of low load of the two-stroke engine. With high load, when overheating of the active catalytic converter layer often occurs, a coolant is injected, most often water, into the cooler which cools a part of the resonator casing and thus drives away redundant heat from the combustion gases in the resonant chamber. The catalytic converter can be placed anywhere along the stabilizing tube depending on construction requirements.

In the resonant chamber, expansion and subsequently compression of combustion gases occurs. In typical case, the cross-section of the stabilizing tube increases in the direction from the inlet opening. The cross-section of the casing will then be adjusted so that the space in the resonant chamber surrounding the stabilizing tube and defined by the casing would ensure continuing of the expansion or the following compression. Particularly, computational resonant length in relation to the length of the exhaust will have an effect on the shape of the casing.

In order for the solution to really enable effective heating regulation of the exhaust gas catalytic converter unit, the casing must exceed at least a part of the catalytic converter on the stabilizing tube. In case of engines and applications with the biggest need to heat the catalytic converter, the resonator casing can preferably exceed the whole catalytic converter.

In the basic embodiment the resonator casing may be simple. In a preferred embodiment it consists of a resonator primary casing and a resonator secondary casing, wherein the resonator primary casing follows with its first end the primary reflective surface, surrounds resonator stabilizing tube, exceeds at least a part of the catalytic converter on the stabilizing tube and is directed towards the secondary reflective surface which is followed by the first end of the resonator secondary casing surrounding at least a part of the resonator primary casing exceeding at least part of the catalytic converter on the stabilizing tube and concluded by the second end of the resonator secondary casing. In such embodiment, the catalytic converter can be heated more intensively because the combustion gas passes at least a part of it twice, first time in the resonator primary casing and second time in the resonator secondary casing. The choice between simple and double casing will depend on needed catalytic converter temperature, raw exhaust emissions of the engine and the engine load.

The cooler provided with coolant inlet and outlet can surround not only a part of resonator casing surrounding stabilizing tube, but preferably also at least a part of the primary reflective surface which is heated by combustion gas coming out of the resonator stabilizing tube. Cooling can be lossless if the cooling circuit is closed. The cooler can be independent or the coolant inlet and outlet from the cooler can be connected to a superior cooling circuit of the powered device, e.g. cooling circuit of a motorbike, etc.

To ensure higher efficiency of the cooling, the coolant can be injected directly into the combustion gas flow from the cooler through a coolant outlet realized in the resonator casing in the form of injection openings directed into the resonant chamber where evaporating of the coolant, which consumes a high amount of heat, occurs. Placement of the injection openings along the resonator casing differs according to the requirements for the thermal reaction control. Thus, the functionality of the catalytic conversion is preserved with variable loads and engine speeds. Further, the catalytic converter service life is increased due to its more stabilized operation conditions. This loss cooling is preferred e.g. with water transport means when the coolant is water which can be injected into the combustion gas flow when coming out from the resonator, or the cooler has also the coolant outlet into the surrounding environment.

The cooler can be multi-chamber, wherein selected chambers can be opened for the coolant depending on the required heat regulation of the system, as needed.

A resonator outlet can be realized basically anywhere in the resonator casing, i.e. between its first end and second end or in the primary reflective surface. It can be arranged on a side of the resonator outside its axis either in the secondary casing or, if the cooling casing is shorter, in the primary casing. Preferably, the resonator outlet opening will extend from the primary reflective surface in the axis of the resonator because this way saving of installation space and lower clogging of the resonator occur due to higher temperatures of combustion gases—there is no carbon deposit. In this embodiment, there is also simple connection of silencer which is, of course, optional and combustion gases can come out from resonator also without it.

BRIEF DESCRIPTION OF THE DRAWINGS

The object of the invention is further illustrated by means of examples of its implementation which are described with reference to the attached drawings. State of the art is demonstrated as follows.

Further drawings show exemplary embodiments of this invention.

EXEMPLARY EMBODIMENTS OF THE INVENTION

The present embodiments illustrate exemplary varieties of the embodiments of the invention, which are not limiting in terms of scope of the invention.

Figure 4:
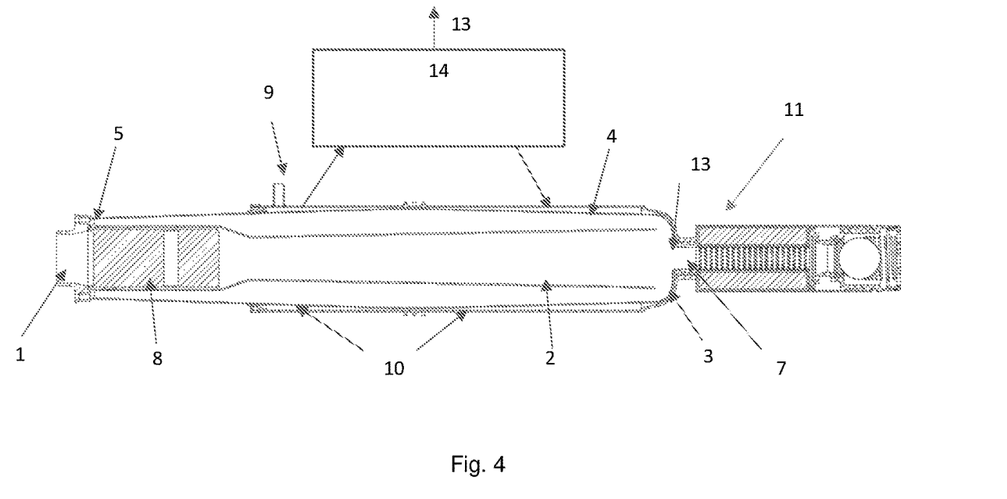
FIG. 4—Elementary embodiment of the exhaust resonator with the catalytic converter, resonator simple casing, closed cooling circuit and combustion gas outlet into the silencer in the axis of the resonator.

The first exemplary embodiment of the invention is illustrated in FIG. 4. In this embodiment, the two-stroke engine exhaust resonator with exhaust gas catalytic converter 8 has the resonant chamber closed only in the resonator simple casing. Exhaust resonator starts with the inlet opening 1, wherein the inlet opening 1 is followed by the first end of the stabilizing tube 2 directed towards the outlet opening 7 of the resonator which is realized in the axis of the resonator. On the initial part, the stabilizing tube 2 is provided with a catalytic converter 8, casing of which has cylindrical shape, and it further consists of casing of a truncated cone opening towards the outlet opening 7 of the resonator. In the stabilizing tube 2, after passing of combustion gases through the catalytic converter 8, an expansion thereof occurs, which then continues into a following part of the resonant chamber defined by the outer surface of the stabilizing tube 2 and resonator casing, which consists of three parts, wherein two parts of truncated cone shape have interconnected bigger circular cross-sections of the truncated cone by the third short cylindrical part. The resonator casing exceeds over the whole length of the catalytic converter 8 and the compression of the combustion gases occurs in the second narrowing part of the resonant chamber defined by the body of the catalytic converter 8 and the resonator casing. Opposite to the second end of the opening stabilizing tube 2 a narrow outlet opening 7 of the resonator surrounded by primary reflective surface 3 is realized, which is followed by the first end of the resonator casing 4. To the outlet opening 7 of the resonator is connected the silencer 11 with a reverse valve. A part of the resonator casing starting at the primary reflective surface and extending towards the catalytic converter 8 is surrounded by a cooler 10. This cooler 10 is lossy, it is provided on its side with a coolant inlet 9 and its coolant outlet 13 guides coolant away into the exhaust resonator at the outlet opening 7 of the resonator. The cooler in this embodiment is realized as a two-chamber cooler and for the regulation of the coolant flow it is provided with one three-way valve 14. In the drawings, the three-way valve 14 has an inlet from one chamber, an outlet into the second chamber and an outlet outside or into the closed cooling system, illustrated by arrows. It operates so that it either shifts coolant from one chamber to another or returns it into the closed cooling system or, in case of open cooling system, this outlet is guided to the inlet point of the coolant to the combustion gas flow. If the cooler 10 was divided into more chambers, it would be provided with adequate number of three-way valves 14.

Figure 5:
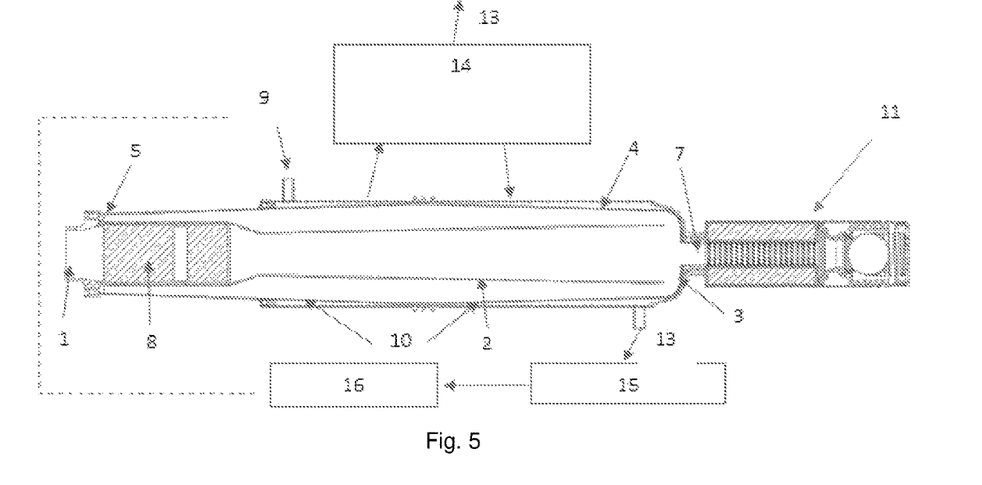
FIG. 5—Basic embodiment of the exhaust resonator with the catalytic converter, resonator simple casing, closed cooling circuit, and combustion gas outlet into the silencer in the axis of the resonator.

Second exemplary embodiment of the invention is illustrated in FIG. 5. This embodiment differs from the previous one by the cooler 10, which is, in this case, lossless. Lossless cooler 10 is part of the closed cooling circuit. Its inlet 9 and outlet of the coolant are connected to the superior cooling circuit 16 of the powered device, e.g. cooling circuit of a motorbike, etc., and controlled by an electric valve 15.

Figure 6:
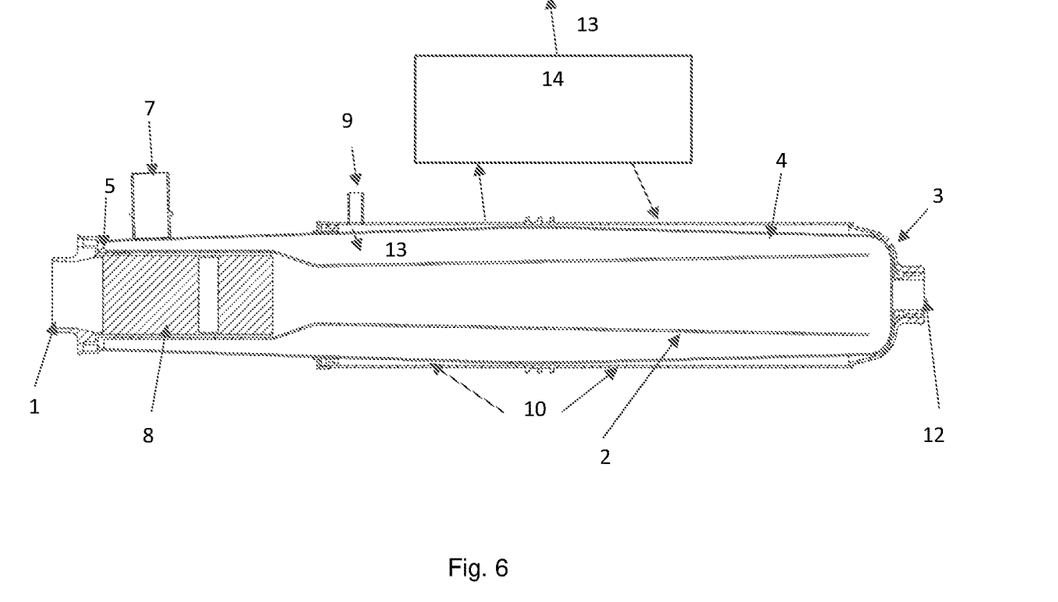
FIG. 6—Basic embodiment of the exhaust resonator with the catalytic converter, resonator simple casing, lossy cooling with the coolant outlet into the resonator, and combustion gas outlet outside the axis of the resonator.

Third exemplary embodiment of the invention is illustrated in FIG. 6. This embodiment differs from the first one by that the inlet opening 7 of the resonator does not extend from the primary reflective surface in the axis of the resonator, it is rather realized in the resonator casing, in this case particularly on its side, and at the level of the catalytic converter 8 which is mounted right at the beginning of the stabilizing tube 2. The opening opposite to the mouth of the stabilizing tube in the axis of the resonator is closed by a plug of the axial combustion gas outlet.

Above illustrated elementary embodiments of the exhaust resonator have simple resonator casing. In the following embodiments, the resonator casing is double and it is formed by the resonator primary casing 4 and the resonator secondary casing 6.

Figure 7:
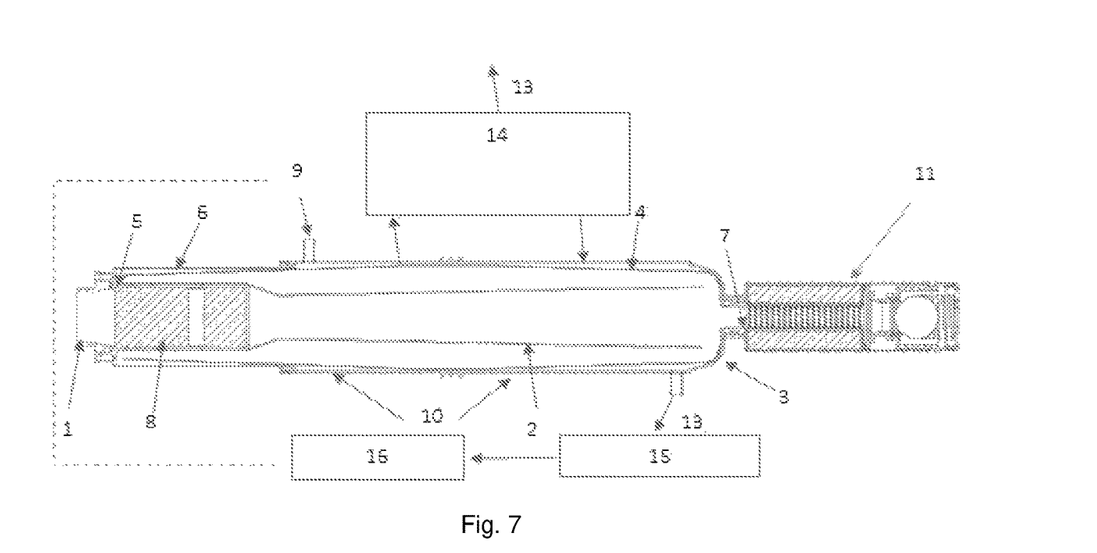
FIG. 7—Embodiment of the exhaust resonator with the catalytic converter, resonator casing made of primary and secondary casing, closed cooling circuit, and combustion gas outlet into the silencer in the axis of the resonator.

The fourth embodiment of the invention is illustrated in FIG. 7. This embodiment differs from the second exemplary embodiment in FIG. 5 only in the embodiment of the resonator casing. In this case, the resonator primary casing 4 follows with its first end the primary reflective surface 3, surrounds the stabilizing tube 2 of the resonator, exceeds almost all of the catalytic converter 8 on the stabilizing tube 2, and is directed towards the secondary reflective surface 5. The secondary reflective surface 5 is placed, due to production reasons, as close to the inlet opening 1 as possible, in this embodiment at the level of the first end of the catalytic converter 8, so that warm combustion gases, as well as in the previous exemplary embodiments, pass around the whole surface of the catalytic converter 8, and this secondary reflective surface 5 is followed by the first end of the resonator secondary casing 6 surrounding, in this case, a part of the resonator primary casing 4 covering the catalytic converter 8 on the stabilizing tube 2, and concluded by the second end of the resonator secondary casing 6 connected to the resonator primary casing. The resonator primary casing corresponds with its shape to the simple casing from the second implementation, only its second casing is a little bit shorter, secondary casing is cylindrically shaped, wherein in other embodiments it can be cone shaped, thus the cross-section of a part of the resonant chamber between the primary casing and the secondary casing of the resonator is getting smaller. This embodiment is characterized in that combustion gases reflected from the first reflective surface pass through the resonant chamber in the direction to the secondary reflective surface 5 and part of them gets into the space between the outer part of the primary casing 4 and the secondary casing 6. Between the second end of the primary casing 4 and the secondary reflective surface 5, which are not interconnected, remains a space for a passage of combustion gas into the interspace between primary and secondary casing 4 and 6.

Figure 8:
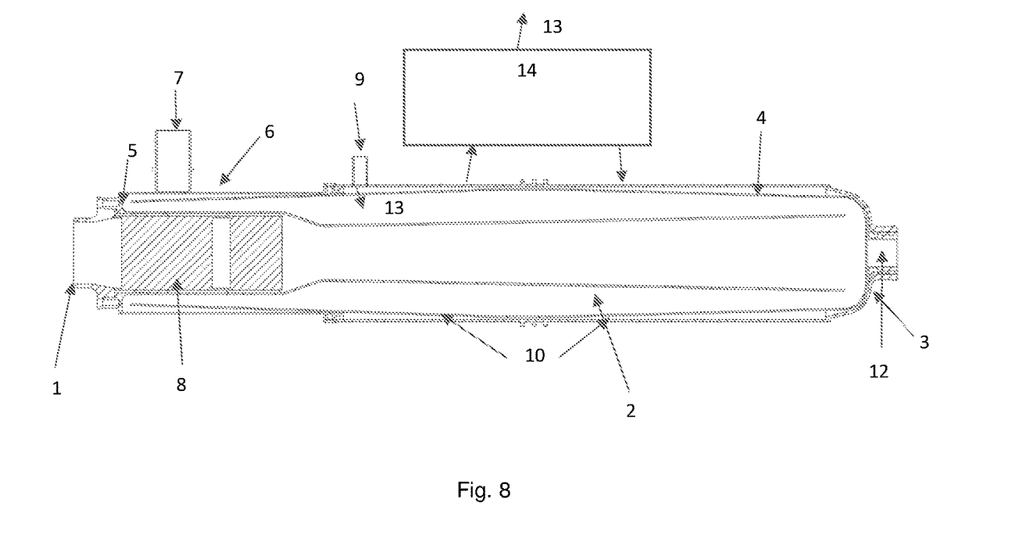
FIG. 8—Embodiment of the exhaust resonator with the catalytic converter, resonator casing made of primary and secondary casing, lossy cooling with the coolant outlet into the resonator, and combustion gas outlet outside the axis of the resonator.

The fifth exemplary embodiment illustrated in FIG. 8 differs from the third one in FIG. 6 also only by the embodiment of the resonator casing. Thus, an exhaust resonator comprising the primary and the secondary casing 4 and 6 of the resonator, lossy cooling with the coolant outlet 13 into the resonator, and combustion gasses outlet outside the axis of the resonator, are concerned. The casing is realized the same way as it is in the fourth embodiment, resonator outlet opening 7 is realized in the resonator casing and, also in this case, namely on its side and at the level of the catalytic converter 8 which is mounted right at the beginning of the stabilizing tube 2. The opening opposite to the mouth of the stabilizing tube in the axis of the resonator is again closed by the plug of the axial combustion gas outlet.

Figure 9:
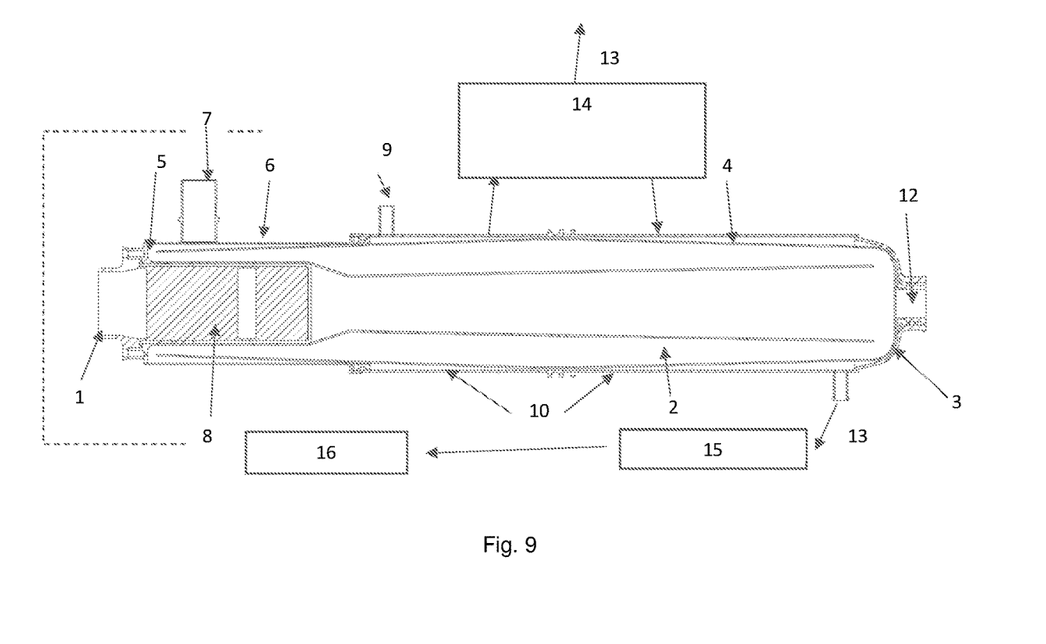
FIG. 9—Embodiment of the exhaust resonator with the catalytic converter, resonator casing made of primary and secondary casing, closed cooling circuit, and combustion gas outlet outside the axis of the resonator.

The sixth exemplary embodiment illustrated in FIG. 9 differs from the fifth one in FIG. 8 by closed cooling circuit only.

INDUSTRIAL APPLICABILITY

The two-stroke engine exhaust resonator with the exhaust gas catalytic converter according to this invention which enables the thermal control of the catalytic reaction can be used in variety of applications with requirement for low emission of exhaust combustion gas and at the same time low installation dimensions. Exemplary usage can be e.g. in motorized surfboards, small single-track vehicles, etc.

LIST OF REFERENCE SIGNS

1—Inlet opening
2—Stabilizing tube
3—Primary reflective surface
4—Resonator primary casing
5—Secondary reflective surface
6—Resonator secondary casing
7—Outlet opening
8—Catalytic converter
9—Coolant inlet
10—Cooler
11—Silencer
12—Plug of the axial combustion gas outlet
13—Coolant outlet
14—Three-way valve
15—Electronic valve
16—Superior cooling circuit

The invention claimed is:

1. A two-stroke engine exhaust resonator comprising:
a resonator casing,
an inlet opening (1) of the resonator casing directly connected to a first end of a stabilizing tube (2) with a catalytic converter (8) mounted thereon,
a second end of the stabilizing tube (2) directed towards a primary reflective surface (3) connected to a first end of the resonator casing which is surrounding the stabilizing tube (2) and thus defining a space in a resonant chamber between the resonator casing and the stabilizing tube (2), and
said space comprising a narrowing part defined by a body of the catalytic converter (8) and the resonator casing, wherein said narrowing part enables compression of combustion gases between the stabilizing tube (2) and the resonator casing following prior expansion of combustion gases coming out from the catalytic converter (8) inside the stabilizing tube (2), and further reflection at the primary reflective surface (3) outside the stabilizing tube (2),
wherein the resonator casing extends over at least a part of the catalytic converter (8) on the stabilizing tube (2),
wherein a resonator outlet opening (7) is arranged in the resonator casing between the first end of the resonator casing and a second end of the resonator casing or in the primary reflective surface (3) of the resonator casing, and
at least a part of the resonator casing surrounding the stabilizing tube (2) is surrounded by a cooler (10).

2. The two-stroke engine exhaust resonator according to claim 1, wherein the cooler (10) is provided with a coolant outlet (13) directed from the cooler (10) through the resonator casing into the resonant chamber for injecting coolant into the combustion gas flow in the resonant chamber.

3. The two-stroke engine exhaust resonator according to claim 1, wherein the catalytic converter (8) is mounted on the stabilizing tube (2) in an initial part.

4. The two-stroke engine exhaust resonator according to claim 1, wherein the cooler (10) surrounds at least a part of the primary reflective surface (3).

5. The two-stroke engine exhaust resonator according to claim 4, wherein the resonator casing exceeds over the whole catalytic converter (8) on the stabilizing tube (2).

6. The two-stroke engine exhaust resonator according to claim 1, wherein the outlet opening (7) of the resonator exits the primary reflective surface (3) in an axis of the resonator.

7. The two-stroke engine exhaust resonator according to claim 6, wherein the catalytic converter (8) is mounted on the stabilizing tube (2) in an initial part.

8. The two-stroke engine exhaust resonator according to claim 1, wherein the resonator casing exceeds over the whole catalytic converter (8) on the stabilizing tube (2).

9. The two-stroke engine exhaust resonator according to claim 8, wherein the outlet opening (7) of the resonator exits the primary reflective surface (3) in an axis of the resonator.

10. The two-stroke engine exhaust resonator according to claim 8, wherein the catalytic converter (8) is mounted on the stabilizing tube (2) in an initial part.

11. The two-stroke engine exhaust resonator according to claim 1, wherein the resonator casing is formed by a resonator primary casing (4) and a resonator secondary casing (6), the resonator primary casing (4) connects, with a first end, to the primary reflective surface (3), surrounds the stabilizing tube (2) of the resonator casing, exceeds at least a part of the catalytic converter (8) on the stabilizing tube (2) and is directed towards a secondary reflective surface (5) which is connected to a first end of the resonator secondary casing (6) surrounding at least a part of the resonator primary casing (4) exceeding at least a part of the catalytic converter (8) on the stabilizing tube (2) and terminating with a second end of the resonator secondary casing (6).

12. The two-stroke engine exhaust resonator according to claim 11, wherein the resonator casing exceeds over the whole catalytic converter (8) on the stabilizing tube (2).

13. The two-stroke engine exhaust resonator according to claim 12, wherein the cooler (10) surrounds at least a part of the primary reflective surface (3).

14. The two-stroke engine exhaust resonator according to claim 13, wherein the cooler (10) is provided with a coolant outlet (13) directed from the cooler (10) through the resonator casing into the resonant chamber for injecting coolant into the combustion gas flow in the resonant chamber.

15. The two-stroke engine exhaust resonator according to claim 14, wherein the catalytic converter (8) is mounted on the stabilizing tube (2) in an initial part.

16. The two-stroke engine exhaust resonator according to claim 14, wherein the outlet opening (7) of the resonator exits the primary reflective surface (3) in an axis of the resonator.

17. The two-stroke engine exhaust resonator according to claim 16, wherein the catalytic converter (8) is mounted on the stabilizing tube (2) in an initial part.

* * * * *